United States Patent

Boguslawski

[15] 3,640,656
[45] Feb. 8, 1972

[54] APPARATUS FOR CONTINUOUS MANUFACTURE OF REINFORCED HOSE

[72] Inventor: Jan J. Boguslawski, New York, N.Y.
[73] Assignee: Fabric Fire Hose Company, Sandy Hook, Conn.
[22] Filed: May 5, 1970
[21] Appl. No.: 34,719

[52] U.S. Cl............................................425/113, 425/377
[51] Int. Cl............................................................B29d 23/05
[58] Field of Search....................18/2 H, 4 S, 6 C, 13 H, 135, 18/13 T, 14 H, 14 A

[56] References Cited

UNITED STATES PATENTS

| | | | |
|---|---|---|---|
| 2,286,922 | 6/1942 | Muller | 18/13 T |
| 2,990,577 | 7/1961 | De Laubarede | 18/14 A |
| 3,159,877 | 12/1964 | Orsini | 18/13 H |
| 3,191,230 | 6/1965 | Ashton | 18/13 H |

*Primary Examiner*—J. Spencer Overholser
*Assistant Examiner*—B. D. Tobor
*Attorney*—Robert J. Patterson

[57] ABSTRACT

Automatic apparatus for continuously coating a tubular or sleeve-shaped reinforcing carcass for a reinforced hose product with a polymeric material by passing the sleeve uniformly through an extruder, is disclosed. A mandrel extends rearwardly from the extruder to the supply station of the sleeve and is adapted to support the latter internally for longitudinal advancing movement toward the extruder. Two stationary clamping members are located between the supply station and the extruder and are adapted to be closed alternatingly into engagement with the mandrel for selectively inhibiting movement of the sleeve along the mandrel at those locations. Two traveling sleeve accumulators, one arranged for reciprocal linear movement intermediate the two stationary clamping members and one for like movement intermediate the second such member and the extruder, are adapted alternatingly to contact respectively juxtaposed portions of the sleeve and push the same along the mandrel, the first accumulator when the first stationary clamping member is opened and the second one closed, and the second accumulator when the second stationary clamping member is open and the first one closed. Two reciprocally traveling clamping members are located between the extruder and the hose takeup station and are adapted alternatingly to contact respective juxtaposed portions of the reinforced hose product, so that the same is at all times being pulled uniformly from the extruder and toward the takeup station. This abstract is not to be taken either as a complete exposition or as a limitation of the present invention, however, the full nature and extent of the invention being discernible only by reference to and from the entire disclosure.

19 Claims, 10 Drawing Figures

FIG. 6

INVENTOR
JAN J. BOGUSLAWSKI 3,640,656

APPARATUS FOR CONTINUOUS MANUFACTURE OF REINFORCED HOSE

BACKGROUND OF THE INVENTION

1. Field of the Invention

This invention relates to an improved apparatus for the continuous manufacture of reinforced hose. More particularly, this invention relates to an improved apparatus for the continuous manufacture of reinforced hose comprising a tubular fabric or reinforced fabric core completely encapsulated within a polymeric, fluid impervious material.

2. Description of the Prior Art

The need for fluid impervious hosing has grown significantly in recent years. The wide range of applications for such hosing, imposed primarily by municipal and industrial applications, has created a demand for internally reinforced hosing capable of withstanding high pressure and/or high vacuum. The apparatus heretofore employed in the manufacture of reinforced hose involved a substantial amount of hand work requiring operators to continually attend to the needs of the equipment. With increasing demand, techniques involving substantial hand operation present potential limitations on output. It is readily apparent that the availability of apparatus for the continuous manufacture of reinforced hose requiring essentially no manual operations would be highly desirable.

In view of the high stresses imposed upon hosing during use at high pressures or under high vacuum, it has become necessary to reinforce the tubular fabric cores with such reinforcing materials as polymeric monofilaments, wire and the like. The apparatus heretofore employed are not readily adaptable to use with such reinforced fabric cores. Consequently, it would be desirable to provide apparatus which enables the continuous manufacture of reinforced hose wherein the fabric reinforcing core is, itself, reinforced.

SUMMARY OF THE INVENTION

Accordingly, it is an object of the present invention to provide apparatus which overcomes the above-noted deficiencies.

It is another object to provide apparatus which enables the continuous manufacture of reinforced hose wherein the reinforcing core is itself reinforced.

It is still another object to provide apparatus to continuously manufacture a wide variety of reinforced hosing requiring essentially no manual operation.

These as well as other objects are accomplished by the present invention which provides an apparatus for continuous manufacture of reinforced hose comprising:

i. feed means being adapted to supply a sleeve of reinforcing carcass;

ii. an extruder spaced from said feed means and having an extrusion coating head mounted thereon being adapted to receive and encapsulate said reinforcing carcass with polymeric material;

iii. a mandrel emanating from said extrusion coating head and terminating proximate said feed means, said mandrel being adapted to receive thereon said sleeve of reinforcing carcass and support said sleeve upon passage thereof to the extrusion coating head;

iv. first and second supported stationary clamping members spaced from each other and situated between said feed means and said extruder, said clamping members being adapted to support said mandrel and to alternately engage said mandrel to continuously maintain said mandrel in axial registration with said extrusion coating head;

v. first and second traveling sleeve accumulators, said first accumulator situated between said first and second clamping members, said second accumulator situated between said second clamping member and said extruder; said first and second accumulators being adapted to sequentially contact at least a portion of the sleeve and push said sleeve to continuously advance said sleeve along said mandrel toward the extruder, while said accumulators travel in the direction of the feed means, said accumulators being further adapted to sequentially disengage from contact with said sleeve and travel freely in the direction of said extruder; said first and second accumulators being adapted to operate in concert with said first and second clamping members to cause continuous advancement of said sleeve, said first clamping member being disengaged during the period said first accumulator contacts and pushes said sleeve; said second clamping member being disengaged during the period said second accumulator contacts and pushes said sleeve;

vi. recovery means spaced from said extruder being adapted to receive the reinforced hose product; and vii. first and second traveling clamping members situated between the extruder and said recovery means, said clamping members being adapted to operate sequentially for at least a portion of the distance between the extruder and said recovery means to continuously pull the reinforced hose product from the extruder to said recovery means.

BRIEF DESCRIPTION OF THE DRAWING

In order to gain a more complete understanding of the apparatus of the present invention, reference is made to the accompanying drawing, wherein:

FIG. 1 is a block diagram showing the relationship of FIGS. 1A and 1B.

DESCRIPTION OF THE INVENTION

Figures 1A, 2, 2A:
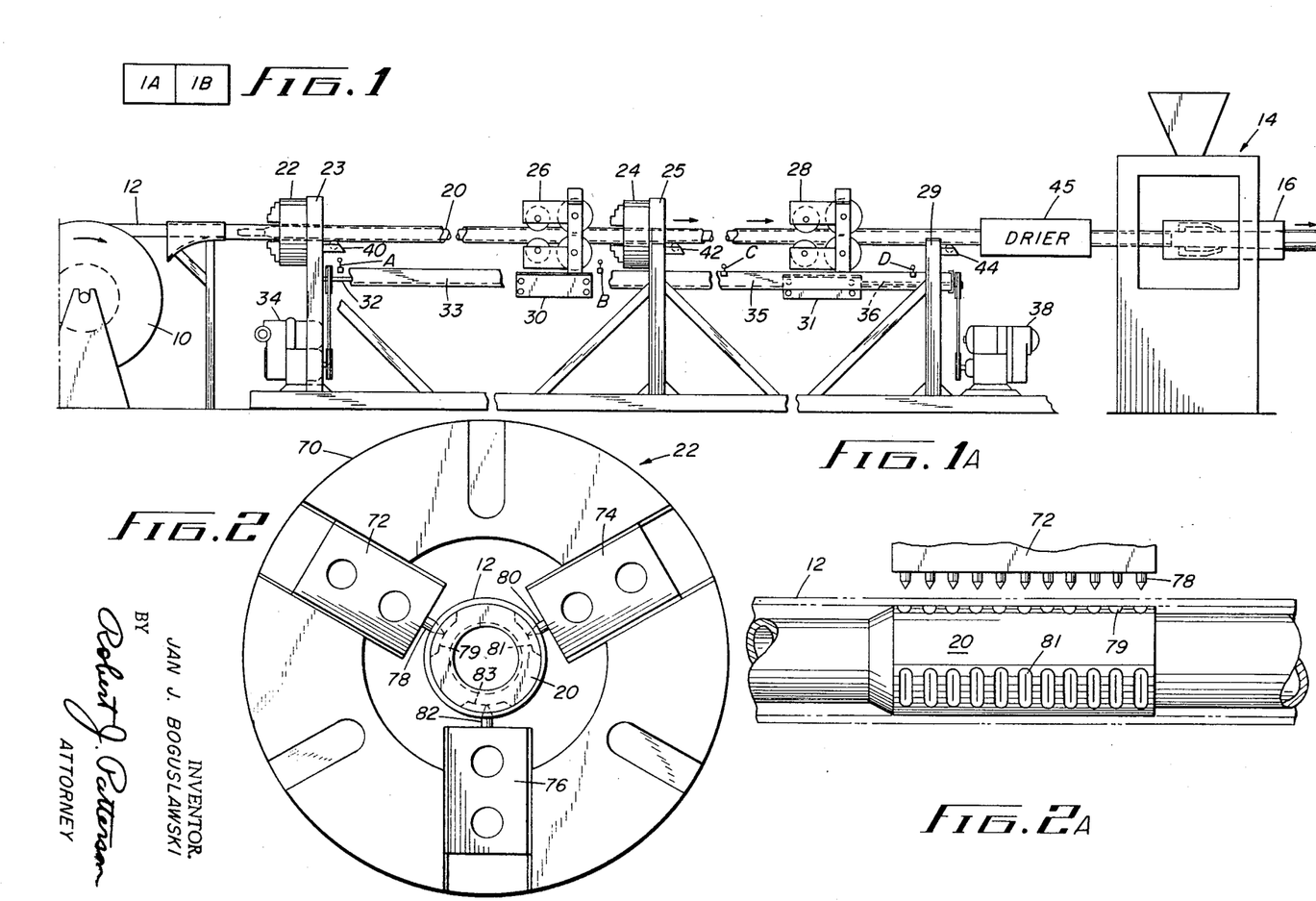
FIGS. 1A and 1B are side elevations, partly schematic, of the assembly of the apparatus according to the present invention.
FIG. 2 is a front view of a stationary clamping member shown engaging the mandrel.
FIG. 2A is an enlarged partial side view showing a toothed jaw of the clamping member in position to engage a series of tooth receiving apertures in the mandrel.
Figures 1B, 5, 6A:
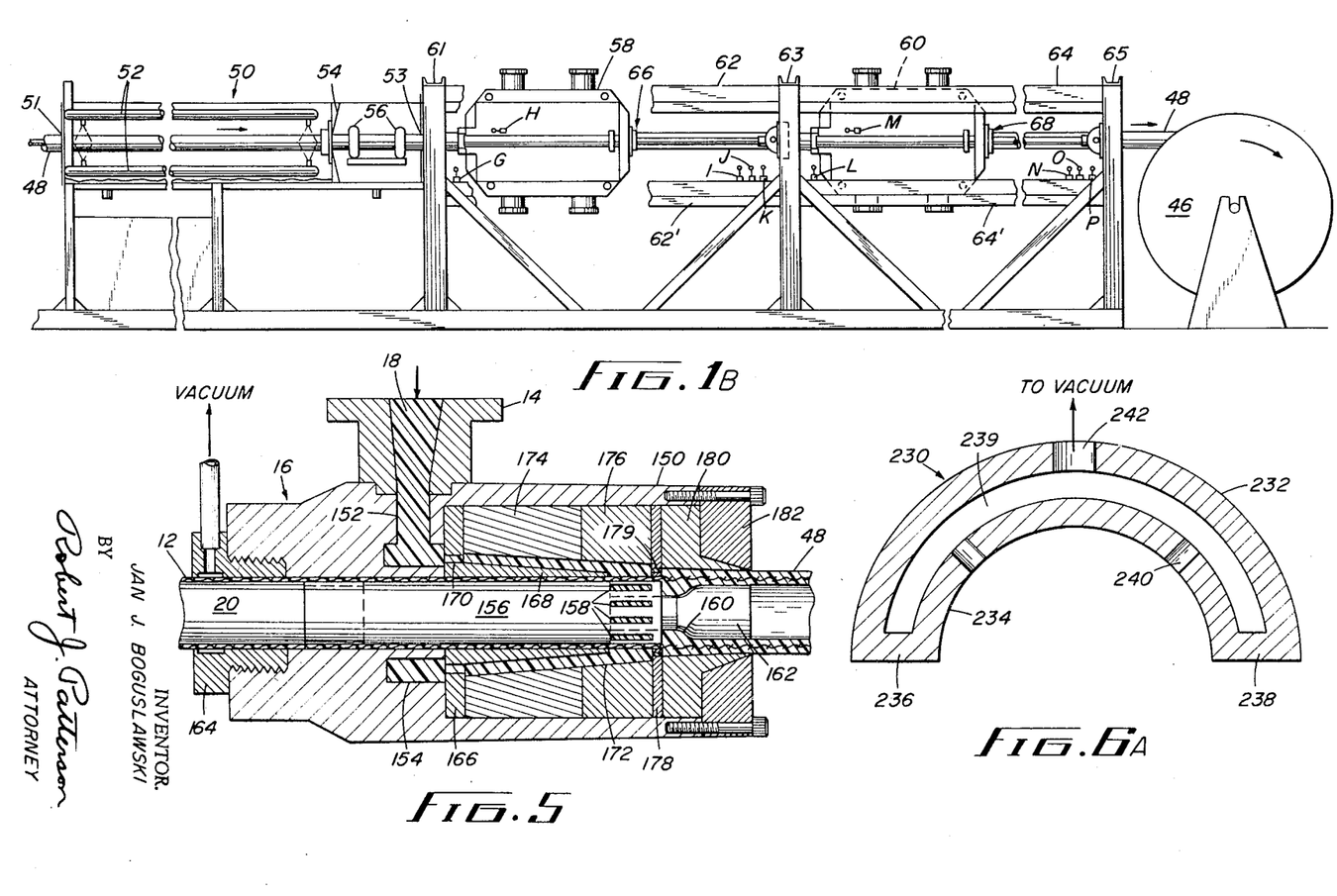
FIG. 5 is a side elevation in section illustrating one embodiment of an extrusion die head adapted to encapsulate the sleeve of reinforcing carcass in a polymeric material.
FIG. 6A is a partial sectional end view of vacuum clamping means adapted to fit within the traveling clamping member.

Referring now to FIGS. 1A and 1B, there is shown one embodiment of the apparatus for continuous manufacture of reinforced hose in accordance with the present invention.

A feed roll 10 carries a sleeve 12 of reinforcing carcass and is adapted to rotate and provide a continuous supply of said reinforcing carcass. An extruder 14 is spaced from said feed roll 10 and is equipped with an extrusion coating head 16 adapted to receive the reinforcing carcass sleeve 12 and coat the inner and outer surfaces thereof with a polymeric material 18. A mandrel 20 emanates from the extrusion coating head 16 wherein it is attached to said head such as by engagement of the terminal threaded portion thereof with a threaded sleeve terminating one end of the internal die within the extrusion head as described hereinbelow in detail with reference to FIG. 5. The mandrel 20 extends rearwardly from the ingress side of said extrusion head 16 and terminates proximate the feed roll 10. The mandrel is of a diameter sufficient to receive thereon the reinforcing carcass sleeve 12 and support said sleeve upon its passage to the extrusion coating head 16. Supported stationary clamping members, respectively designated 22 and 24, are spaced from each other and situated between the feed roll 10 and the extruder 14 and supported, respectively, upon upright stanchions 23 and 25. The stationary clamping members 22 and 24 are adapted to receive the mandrel 20 through apertures therein and to alternately engage said mandrel 20 to maintain the mandrel in axial registration with the extrusion head 16 and prevent advancement of the mandrel 20 during operation. Traveling sleeve accumulators 26 and 28 are adapted to sequentially contact at least a portion of the reinforcing carcass sleeve 12 and push said sleeve to provide continuous advancement of said sleeve along the mandrel 20 to the extrusion head 16. Traveling sleeve accumulator 26 is situated between stationary clamping members 22 and 24 and is adapted to travel therebetween by riding on a carriage 30 in tracks 33 and 33' supported by upright stanchions 23 and 25, the carriage being driven by a feed screw 32 motivated by a motor 34, preferably a variable speed motor. Traveling sleeve accumulator 28 is situated between stationary clamping member 24 and upright stanchion 29 and is adapted to travel therebetween by riding on a carriage 31 in tracks 35 supported by upright stanchions 25 and 29, the carriage being driven by a feed screw 36 independently motivated by a motor 38, also preferably a variable speed motor. Idler rollers 40, 42 and 44, respectively attached to stanchions 23, 25 and 29, provide support for the mandrel 20 and aid in maintaining the mandrel in axial registration with the extrusion head 16.

In operation, the first traveling sleeve accumulator 26 engages the reinforcing carcass sleeve 12 which envelops the mandrel 20 and pushes said sleeve to continuously advance said sleeve along the mandrel in the direction of extruder 14, while said accumulator 26 is simultaneously traveling in the direction of the feed roll 10. While said first accumulator 26 is engaged, the first supported stationary clamping member 22 is in an open position to allow free movement of the reinforcing carcass sleeve 12 from the feed roll 10 onto the mandrel 20. The second stationary clamping member 24 is in a closed position and engages and supports the mandrel 20. The second traveling sleeve accumulator 28 is disengaged from the mandrel 20 and travels freely in the direction of the extruder 14 in a sequential relationship with the first accumulator 26 such that upon the first accumulator's completion of its engaged cycle wherein it is continuously advancing the sleeve 12 in the direction of the extruder, the said second accumulator 28 will be at the end of its track 35 proximate stanchion 29 in position to engage the mandrel containing the accumulated sleeve and advance said sleeve upon its passage to the extruder. As with the first accumulator 26, the second accumulator engages and advances the sleeve towards the extruder 14 while simultaneously traveling in the direction of the feed roll 10. Prior to engagement of the second accumulator 28 with the sleeve, and upon completion of the first accumulator's engaged cycle, the first stationary clamping member 22 closes and engages the mandrel 20; then, the second stationary clamping member 24 opens to permit passage of the accumulated sleeve therethrough. During the engaged cycle of the second accumulator 28, the first accumulator 26 is in disengaged position traveling freely in its track 33 in the direction of the extruder to return to its starting position to commence a new cycle. In this manner, the reinforcing carcass sleeve is continuously being fed to the extruder.

It is considered preferable to employ drying means such as dryer 45 situated between stanchion 29 and the extruder 14 to remove absorbed or absorbed fluids from the sleeve prior to entry into the extruder. Fluids such as moisture, treatment fluids and the like can vaporize under the conditions maintained within the extruder and interfere with the application of a smooth, impervious polymeric coating onto the sleeve. Any convenient drying means such as a forced air dryer, electric dryer and the like being adapted to receive the mandrel 20 with the reinforcing carcass sleeve thereon and permit passage of said sleeve therethrough can be suitably employed.

A windup roll 46 is spaced from the extruder and is adapted to rotate and continuously receive the reinforced hose product 48. A cooling chamber 50 is preferably situated between the extruder 14 and the windup roll 46. The cooling chamber 50 has an inlet 51 and outlet 53 adapted to receive the reinforced hose product 48 and permit passage of said product therethrough. The cooling chamber is adapted to contact the hose product upon passage therethrough with a coolant such as by spray means 52. Any similar means of providing contact of the hose product with a coolant such as by maintaining a water bath in the cooling chamber can suitably be employed. Proximate the outlet 53 of the cooling chamber and either within or without said chamber, wiper means 54 can be employed, if desired, to substantially remove residual coolant from the hose product 48. Means for providing a high velocity stream of air, such as annular air knives 56, adapted to contact the periphery of the hose product 48 and further remove residual coolant and dry said product can be employed, if desired, and can be similarly situated.

Traveling clamping members 58 and 60 are situated between the cooling chamber 50 and the windup roll 46. The traveling clamping members 58 and 60 are adapted to operate in sequence to continuously pull the hose product 48 from the extruder 14 to the windup roll 46. The traveling clamping members 58 and 60 can be hydraulically actuated although any other suitable means of actuation can be employed. Clamping members 58 and 60 travel, respectively, on rollers in upper and lower tracks 62 and 62' and 64 and 64' which are suspended between upright stanchions 61, 63 and 65.

In operation, the first traveling clamping member 58 engages the periphery of that portion of the hose product 48 contacted by annular platens 66 contained within said member 58 and pulls said hose product from the extrusion coating head 16 through the cooling chamber 50 and advances the product toward the windup roll 46. As the first traveling clamping member 58 approaches stanchion 63, the second traveling clamping member 60, which operates sequentially with said first clamping member 58, is situated proximate stanchion 63 and engages the periphery of that portion of the hose product 48 contacted by annular platens 68 contained within said clamping member 60 and pulls said hose product toward the windup roll 46. For a very brief period of travel, both traveling clamping members 58 and 60 engage the hose product 48 and pull it toward the windup roll 46. The first traveling clamping member 58, upon completion of its engaged pulling cycle disengages from contact with the hose product 48 and travels freely toward stanchion 61 to be in a position to reengage the hose product and renew its engaged pulling cycle when the second traveling clamping member 60 essentially completes its engaged pulling cycle. Similarly, when said traveling clamping member 60 completes its engaged pulling cycle, it disengages from contact with the hose product and travels freely in the direction of stanchion 63 to be in a position to reengage the hose product and renew its engaged pulling cycle when the first traveling clamping member 58 essentially completes its engaged pulling cycle. In this manner, the hose product is continuously pulled from the extrusion coating head 16, cooled and dried and advanced to windup roll 46.

In one embodiment of the present invention, the first and second stationary clamping members 22 and 24 can be automatically and sequentially operated three-jaw chucks such as shown in FIG. 2 with reference being made to stationary clamping member 22 although, of course, the description is equally applicable to clamping member 24. The three-jaw chuck shown generally as 22 comprises an annular base 70 and a plurality of jaws 72, 74 and 76 seated in said base 70, each being adapted to travel radially in said base. Each of said jaws 72, 74 and 76 terminates in toothed engaging means 78, 80 and 82. The mandrel 20 containing the sleeve of reinforcing carcass 12 thereon passes axially through the annular base 70 of said clamping member 22.

The mandrel 20 contains therein three banks of tooth-receiving apertures 79, 81 and 83 disposed about the circumference thereof, each of said banks containing a plurality of said tooth-receiving apertures. As shown in FIGS. 2 and 2A, the toothed engaging means 78, 80 and 82 are adapted to engage and support said mandrel 20 at said banks of tooth receiving apertures 79, 81 and 83. The toothed engaging means pass through the interstices of the sleeve of reinforcing carcass 12 to engage the mandrel.

The tooth receiving apertures in each bank, as well as their respective toothed engaging means, can be either in alignment with said apertures and engaging means in the adjacent banks or be staggered to conform to the pitch of the helical windings of the reinforcing materials. The latter spatial arrangement is considered preferable, especially for hose of smaller diameters, in order to insure that the toothed engaging means do not encounter the reinforcing material as they pass through the interstices of the sleeve to engage the mandrel. The stationary clamping members 22 and 24 operate in a sequence such that both clamping members engage the mandrel before one of said clamping members disengages therefrom thereby insuring continuous engagement of at least one of said clamping members with the mandrel at all times. This is considered necessary to provide continuous support for the mandrel and to maintain it in axial registration with the extrusion head 16.

Figure 3:
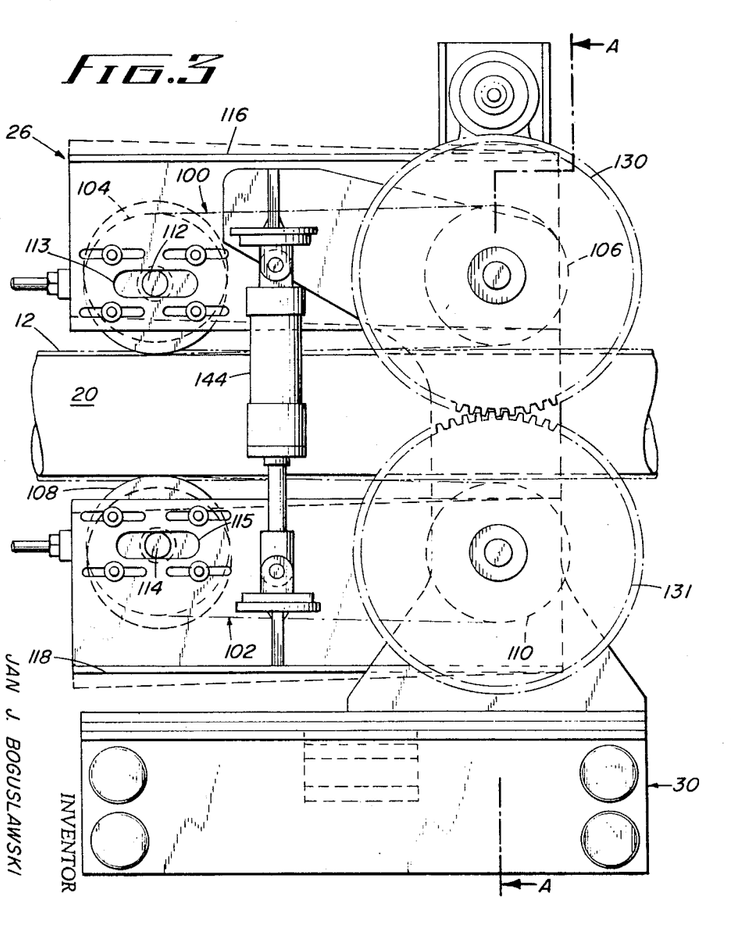
FIG. 3 is a side elevation of a traveling sleeve accumulator illustrating both the engaged and disengaged (dotted) positions thereof with respect to the mandrel.
Figure 4:
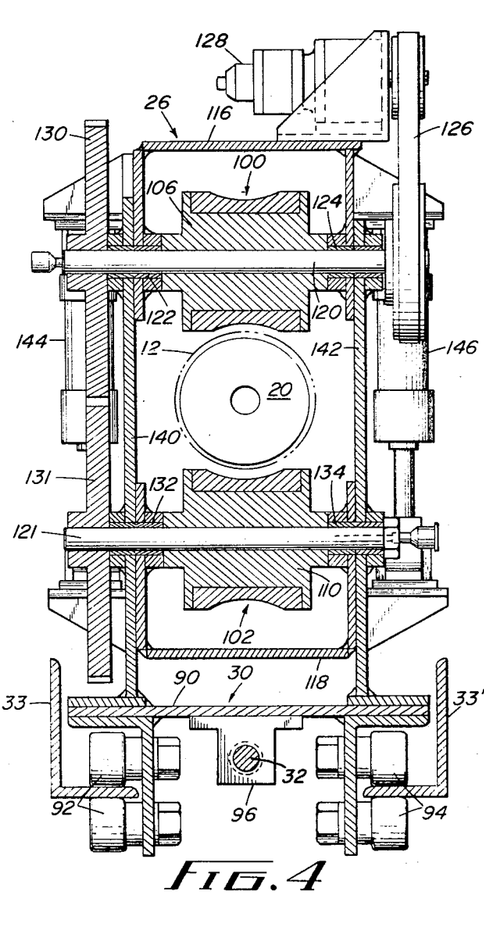
FIG. 4 is an end view of the traveling sleeve accumulator in section along the line A—A in FIG. 3.

The detailed assembly of a traveling sleeve accumulator such as 26 and 28 is shown in FIGS. 3 and 4. The traveling sleeve accumulator 26 travels on a carriage 30 comprising a platform 90 from which depend two opposed sets of spaced rollers 92 and 94 adapted to engage tracks 33 and 33' to establish a path of travel. The carriage 30 is driven by engagement of feed nut 96 with feed screw 32 driven by motor 34. The sleeve accumulator 26 comprises two opposed belts 100 and 102 which are adapted to engage the sleeve of reinforcing carcass 12 enveloping the mandrel 20 and push and gather said sleeve to establish a continuous excess of reinforcing carcass on said mandrel 20 to enable continuous feeding thereof to the extrusion head 16. The belts 100 and 102 are respectively mounted for rotation about spaced rollers 104 and 106 and 108 and 110. Rollers 104 and 108 are adapted to freely rotate about their respective axles 112 and 114 journaled for rotation in slots 113 and 115 in upper and lower belt housings 116 and 118 respectively. Roller 106 is mounted on axle 120 which is journaled for rotation within the upper belt housing 116 in bushings 122 and 124 respectively. The belt 100 is driven by drive belt 126 connecting one end of the axle 120 to motor 128. The opposed end of said axle 120 carries a spur gear 130 mounted thereon to transmit rotation from the drive axle 120 to the driven axle 121 through spur gear 131. Belt 102 is caused to rotate by the rotation of roller 110 mounted on said driven axle 121. Driven axle 121 is journaled for rotation within the lower belt housing 118 in bushings 132 and 134 respectively.

Upright opposed structural members 140 and 142 connect the upper and lower belt housings 116 and 118 at axles 120 and 121 forming, in essence, a pivot about which the housings 116 and 118 can rotate to cause engagement or disengagement (shown dotted) of the belts 100 and 102 with the reinforcing carcass sleeve 12 on the mandrel 20. If desired, the belts 100 and 102 can be grooved to better accommodate and contact the sleeve 12 on the mandrel 20. Opposed air cylinders 144 and 146, each attached to both the upper and lower belt housings 116 and 118, provide the motive force causing engagement and disengagement of the belts with the sleeve on the mandrel. Although air cylinders are shown, such cylinders also can be hydraulically actuated, if desired.

In operation, the belts 100 and 102 are caused to rotate by motor 128 at a faster speed than that of the feed screw 32 in order to obtain the desired accumulating or gather effect on the reinforcing carcass sleeve 12. Generally, the belts rotate about 5 percent faster than the feed screw, although higher or lower relative speeds can be employed if desired. The sequential operation of the traveling sleeve accumulators provides a continuous supply of reinforcing carcass to the extrusion coating head. Depending upon the ultimate end use of the hose product, the reinforcing carcass can be coated with a polymeric material on the outer surface thereof, the inner surface thereof, or both. Preferably, the reinforcing carcass is completely encapsulated within a polymeric material. To attain complete encapsulation of the reinforcing carcass, an extrusion coating head 16 such as shown in FIG. 5 can be suitably employed.

The extrusion coating head shown generally as 16 comprises a housing 150 adapted to be connected to the extruder 14 and receive the polymeric effluent 18 therefrom. The housing 150 is bored out to provide an annular passageway adapted to receive the mandrel 20 with the sleeve of reinforcing carcass 12 thereon and to permit passage of said sleeve therethrough. The polymeric effluent 18 enters the housing 150 through a bore 152 therein in which there is an annular chamber 154. The housing is further bored out to provide an annular chamber adapted to receive a number of elements which cooperatively form a die capable of coating the inner and outer surfaces of the sleeve of reinforcing carcass 12. The mandrel 20 terminates within the housing 150. An internal die member 156 is attached to the terminal portion of the mandrel within the housing. The internal die member 156 contains a plurality of apertures 158 therein opening into an annular pocket 160 which terminates with the internal sizing die 162. A vacuum collar 164 is attached to the ingress end of the housing 150 and is connected to a vacuum source (not shown). The internal diameter of the vacuum collar 164 can be slightly less than the external diameter of the sleeve 12 thereby providing a slight crush or compression to the sleeve. The vacuum collar serves to remove any occluded air from the sleeve which could be detrimental to the coating process. Abutting the annular chamber 154 in the housing 150 is a ring 166 terminating in a turned down sleeve 168. The ring 166 contains a plurality of apertures 170 therein permitting controlled passage of the polymeric material 18 from the annular chamber 154 into passageway 172 formed by sleeve 168 and annular spacing rings 174 and 176. An annular collar 178 containing a plurality of apertures 179 therein forces a portion of the polymeric material 18 through the interstices of the reinforcing carcass sleeve 12 into apertures 158 and into pocket 160 to be applied to the sleeve 12 as an internal coating of predetermined thickness by internal sizing die 162. The residual polymeric material passes through apertures 179 and is applied to the sleeve 12 as an external coating of predetermined thickness by external sizing die 180. Cap 182 is bolted to the housing 150 to hold the various elements in position. The hose product 48 emerges from the extrusion coating head 16 comprising the reinforcing carcass sleeve 12 completely encapsulated in the polymeric material 18.

Upon emergence from the extrusion coating head 16, the hose product 48 is cooled and dried by passing through cooling chamber 50 and is continuously pulled to the windup roll 46 by traveling clamping members 58 and 60.

Figure 6:
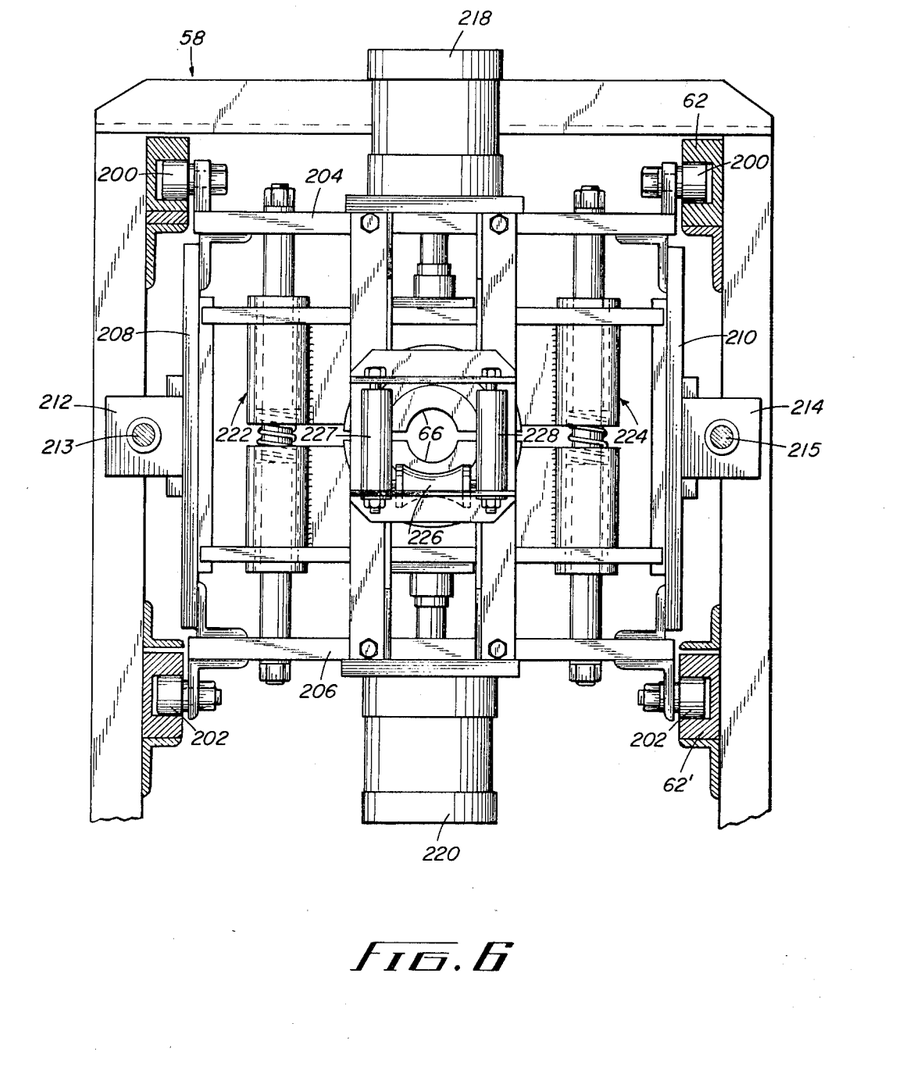
FIG. 6 is an end view of one embodiment of a traveling clamping member.

As shown in FIG. 6, traveling clamping member 58 travels in upper and lower tracks 62 and 62' upon opposed sets of upper and lower rollers 200 and 202. The rollers are attached to horizontal structural frame elements 204 and 206, respectively. The horizontal structural elements are both attached to vertical structural elements 208 and 210. These vertical structural elements 208 and 210 contain hydraulic cylinders 212 and 214, respectively. The hydraulic cylinders and the piston rods 213 and 215 respectively contained therein are of sufficient length to permit the traveling clamping member 58 to travel the distance between stanchions 61 and 63 of FIG. 1B. Each traveling clamping member is equipped with a pump (not shown) to control the flow of hydraulic fluid to the associated cylinders. Thus, the traveling clamping members are adapted to travel at different speeds. Air cylinders 218 and 220 actuate opposed annular platens 66 causing said platens to engage the hose product 48. If desired, cushioning pads can be attached to the interior walls of said platens 66 to absorb the engagement pressure of said platens upon the hose product 48. The cushioning pads can be composed of any soft resilient material such as rubber, felt, sponge and the like. When the air pressure in the air cylinders is released, spring-loaded release cylinders 222 and 224 cause disengagement of said annular platens 66. Horizontal roller 226 and vertical rollers 227 and 228 cooperate to support and guide the hose product 48 when said platens 66 are disengaged.

The traveling clamping members are adapted to operate in sequence to provide continuous pulling of the hose product 48 to the windup roll. In operation, when traveling clamping member 58 has engaged the hose product, it pulls said hose product in the direction of the windup roll at linear speeds of from about 6.5 to about 7 feet per minute. Simultaneously, traveling clamping member 60 travels in the opposite direction in a disengaged position at the linear speed of from about 8 to about 10 feet per minute thereby enabling said second traveling clamping member 60 to reach the starting position of its engaged cycle before the first traveling clamping member 58 completes its engaged cycle. In this manner, the second traveling clamping member 60 can engage the hose product and, for about 0.5 second, both members 58 and 60 are pulling the hose product. Thereafter, the first traveling clamping member disengages from the hose product and travels freely in the opposite direction to return to its starting position to repeat the cycle.

Although the pressure imposed upon the hose product is quite small, since the pressure is distributed over the length of the traveling clamping member, certain hose products such as those prepared from carcass reinforced with nylon monofilament could possibly be subject to collapse or disfigurement. Accordingly, in an alternate embodiment of the present invention, the traveling clamping members can be modified by removing the annular platens 66 and inserting in lieu thereof annular vacuum platens as shown in FIG. 6A.

The annular vacuum platens comprise an upper platen 230 and an essentially identical lower platen (not shown). Platen 230 comprises an outer semicylindrical wall 232 and a spaced inner, concentric semicylindrical wall 234, said inner and outer walls being joined by end walls 236 and 238 to define a semiannular vacuum chamber 239 therebetween. Inner wall 234 contains a plurality of vacuum ports 240 therein. Outer wall 232 contains an aperture 242 therein leading to a vacuum source (not shown). In operation, air cylinders 218 and 220 bring said upper and lower annular vacuum platens into position proximate the hose product. The vacuum source is activated evacuating the vacuum chambers 239 and causing the hose product to be drawn to the inner walls of said platens thereby providing sufficient frictional engagement between the platens and the hose product to enable the traveling clamping members to advance the hose product to the windup roll 46 without deleterious effects. If desired, porous cushioning pads can be attached to the interior walls of the vacuum platens to absorb the engagement pressure of said platens upon the hose product 48. The cushioning pads can be comprised of any soft, resilient material exhibiting sufficient porosity to avoid interference with the evacuation of the vacuum chambers such as sponge, porous rubber and the like.

The apparatus of the present invention can be employed to coat a wide variety of reinforcing carcass materials with any suitable polymeric material. For example, the reinforcing carcass sleeve can be prepared from any natural or synthetic materials that can be formed into a tubular sleeve by conventional molding, weaving, braiding or nonweaving techniques. Illustrative materials are those such as cotton, rayon, nylon, polyester, poly(vinyl alcohol), cellulose acetate, silk and the like in the form of fibers, yarn or even in nonwoven form. The tubular sleeves can be further reinforced by inclusion therein of metal wires, glass filaments, conventional filaments such as nylon monofilaments and the like. These reinforcing materials can be incorporated into the carcass during the weaving, braiding or the like of the carcass material.

The specific choice of polymeric coating material is not considered critical and can vary widely depending upon the ultimate application of the hose product. Any extrudable polymeric material, whether thermoplastic, thermosetting or elastomeric can be suitably employed. Illustrative polymeric materials are thermoplastics such as polyethylene, polypropylene, polystyrene, polyesters, poly(vinyl chloride), poly(vinylidene chloride), vinyl chloride-vinyl acetate copolymer, acrylonitrile-butadiene-styrene interpolymers and the like; thermosetting resins such as silicone resins, phenol-formaldehyde resins, melamine-formaldehyde resins, epoxy resins and the like; elastomers capable of being cross-linked, vulcanized or otherwise cured such as natural rubber, chloroprene rubbers, polybutadiene, ethylene-propylene-diene rubbers (EPDM), ethylene propylene rubbers, ethylene-propylene terpolymer rubbers, butyl rubbers, nitrile rubbers, polyisoprene, styrene-butadiene rubbers (SBR), styrene-isoprene rubbers, block copolymers such as styrene-butadiene-styrene, styrene-isoprene-styrene, and blends of the aforementioned materials.

When curable polymeric materials are employed, i.e., materials which undergo cross-linking or vulcanization, it is necessary to employ a curing chamber after the polymeric materials have been coated onto the reinforcing carcass sleeve. The curing chamber can be adapted to receive the hose product and to effect curing thereof by heating, such as by induction heating, live steam injection, hot air or the like, or by use of other conventional curing techniques. When a curing chamber is employed, it is not considered necessary to pass the cured hose product through the cooling chamber as the cured product exhibits sufficient strength and integrity of structure not to be damaged or deformed by action of the traveling clamping members. If a thermoplastic material is employed, a curing chamber is not required; however, the hose product must be cooled upon passage through the cooling chamber to give sufficient strength and structural integrity to proceed further in the train of apparatus.

In a preferred mode of operation of the apparatus of the present invention to continuously manufacture reinforced hose product, the reinforcing carcass sleeve 12 is manually threaded over the mandrel 20 and through the entire apparatus providing a sufficient accumulation of reinforcing carcass just prior to the extruder 14 to enable continuous operation during startup. The first stationary clamping member 22 is in a disengaged position to allow passage therethrough of reinforcing carcass 12 from the feed roll 10. The second stationary clamping member 24 is in an engaged position supporting the mandrel 20. Traveling sleeve accumulators 26 and 28 are positioned at limit switches B and C, respectively. The traveling clamping members 58 and 60 are positioned at limit switches G and O, respectively. Once all elements of the apparatus are in the positions set forth hereinabove, the extruder 14 is activated, all hydraulic and vacuum pumps are started and the dryer 45 is placed in operation.

Thereupon, the traveling sleeve accumulators 26 and 28, the stationary clamping members 22 and 24 and the traveling clamping members 58 and 60 commence automatic sequential cycles to effect continuous feeding of the reinforcing carcass to the extruder and continuous withdrawal of the hose product from the extruder to the windup roll as follows:

Traveling sleeve accumulator 26 commences traveling in the direction of limit switch A with its belts 100 and 102 engaging the sleeve of reinforcing carcass 12 on the mandrel 20. Accumulator 26 operates at a slightly higher velocity, i.e., about 5 percent, than the traversing velocity of the carriage 30 as determined by the feed screw 32. Operating in this manner, the accumulator is able to gather, push and accumulate the sleeve of reinforcing carcass in its wake as it traverses the track 33/33'. Simultaneously therewith, traveling sleeve accumulator 28 commences traveling freely in the direction of limit switch D with its belts in disengaged position. When accumulator 26 reaches and activates limit switch A and accumulator 28 reaches and activates limit switch D, both accumulators stop, and the belts on accumulator 26 assume a disengaged position and cease to rotate. After a time delay of about 0.5 second, stationary clamping member 22 closes and engages and supports mandrel 20. Thereafter, stationary clamping member 24 opens to permit advancement of the accumulated sleeve toward the extruder. Traveling clamping member 28 then commences to travel toward limit switch C, with its belts engaging the sleeve 12 on mandrel 20 and operating at a slightly higher velocity, i.e., about 5 percent, than the traversing velocity of the carriage 31 as determined by feed screw 36. In this manner, the sleeve of reinforcing carcass previously accumulated by accumulator 26 is continuously gathered, pushed and advanced upon its journey to the extruder. Simultaneously therewith, accumulator 26 commences freely moving toward limit switch B with its belts in a disengaged position. When accumulator 26 reaches and activates limit switch B and accumulator 28 reaches and actuates limit switch C, both accumulators stop and the belts on accumulator 28 assume a disengaged position and cease to rotate. After a time delay of about 0.5 second, stationary clamping member 24 closes and engages and supports the mandrel 20. Thereupon, stationary clamping member 22 opens to once again allow entry of reinforcing carcass sleeve from the feed roll 10. At this point, one automatic cycle of the accumulator section of the apparatus has been completed. The apparatus is adapted to continually cycle in this manner for as long as required. This cycle assures a continuous supply of reinforcing carcass to the extruder. Of course, prior to entering the extruder, the reinforcing carcass is heated in dryer 45 to remove any occluded fluid and to raise the sleeve to a temperature close to that maintained in the extrusion coating head 16.

The hose product comprising the sleeve of reinforcing carcass completely encapsulated in a polymeric material is continuously pulled from the extrusion coating head 16 by the traveling clamping members 58 and 60 to the windup roll 46. If the polymeric material is of the type requiring curing, the traveling clamping members pull the hose product first through a curing chamber wherein the hose product is exposed to heat or other curing methods to emerge therefrom as a strong, tough material which can be directly handled by the traveling clamping members without fear of adversely affecting the hose product. If, however, the polymeric material is one which does not require curing or, if the curing operation is to be done at a later stage in the manufacture of the hose, the hose product is first pulled through the cooling chamber 50 wherein it is bathed or sprayed with water or other coolant and any residual coolant is removed by hose-wiping means 54 and/or air knife 56.

The sequential operation of the traveling clamping members 58 and 60 which insures continuous pulling of the hose product from the extruder to the windup roll is as follows:

Traveling clamping member 58 engages the hose product 48 and commences traveling toward limit switch J pulling the hose with it. Simultaneously therewith, traveling clamping member 60, in a disengaged position, commences moving toward limit switch L at a higher velocity than that at which clamping member 58 is traveling. When traveling clamping member 60 reaches and actuates limit switch L, it stops. Traveling clamping member 58 reaches and actuates limit switch I which activates traveling clamping member 60 to start moving toward limit switch O in a disengaged position. When clamping member 60 releases limit switch L, the annular platens thereof clamp down and engage the hose product 48. At this point, both clamping members 58 and 60 are engaged and pulling the hose product toward the windup roll at the same speed. When traveling clamping member 58 reaches and actuates limit switch J, the annular platens thereof open and disengage from the hose product, releasing limit switch H. Release of limit switch H reverses direction of clamping member 58 prior to reaching safety limit switch K. If limit switch K is actuated, it immediately stops traveling clamping member 58 and takes the entire traveling clamping section of the apparatus out of automatic operation.

Once the direction of clamping member 58 is reversed, it travels in a disengaged position toward limit switch G at a higher velocity than that at which clamping member 60 is traveling. When clamping member 58 reaches and actuates limit switch G, it stops. Thereafter, clamping member 60, still in engaged position, reaches and actuates limit switch N, which causes clamping member 58 to start to travel in disengaged position toward limit switch J. When clamping member 58 releases limit switch G, the annular platens thereof clamp down and engage the hose product. At this point, both traveling clamping members 58 and 60 are engaged and pulling the hose product toward the windup roll at the same speed. Traveling clamping member 60 thereupon actuates limit switch O causing its annular platens to open and disengage from the hose product and simultaneously release limit switch M. Release of limit switch M reverses the direction of travel of clamping member 60 prior to reaching safety limit switch P. If limit switch P is actuated, it stops traveling clamping member 60 and takes the entire traveling clamping member section out of automatic operation. At this point, one automatic cycle of the traveling clamping member section of the apparatus has been completed and the clamping members are in position to repeat the sequence.

The specific mode of operation of the apparatus of the present invention as set forth herein is merely intended to illustrate the present invention. Various other conditions, operations, variations and modifications will occur to those skilled in the art upon a reading of the present disclosure. These are intended to be included within the scope of this invention.

What is claimed is:

1. Apparatus for continuous manufacture of reinforced hose comprising:
   i. feed means being adapted to supply a sleeve of reinforcing carcass;
   ii. an extruder spaced from said feed means and having an extrusion coating head mounted thereon being adapted to receive and coat said reinforcing carcass with polymeric material;
   iii. a mandrel emanating from said extrusion coating head and terminating proximate said feed means, said mandrel being adapted to receive thereon said sleeve of reinforcing carcass and support said sleeve upon passage thereof to the extrusion coating head;
   iv. first and second supported stationary clamping members spaced from each other and situated between said feed means and said extruder, said stationary clamping members being adapted to support said mandrel and to alternately engage said mandrel to continuously maintain said mandrel in axial registration with said extrusion coating head;
   v. first and second traveling sleeve accumulators, said first accumulator situated between said first and second stationary clamping members, said second accumulators situated between said second stationary clamping member and said extruder; said first and second accumulators being adapted to sequentially contact at least a portion of the sleeve and push said sleeve to continuously advance said sleeve along said mandrel toward the extruder while said accumulators travel in the direction of the feed means, said accumulators being further adapted to sequentially disengage from contact with said sleeve and travel freely in the direction of said extruder; said first and second accumulators being adapted to operate in concert with said first and second stationary clamping members to cause continuous advancement of said sleeve, said first stationary clamping member being disengaged during the period said first accumulator contacts and pushes said sleeve; said second stationary clamping member being disengaged during the period said second accumulator contacts and pushes said sleeve;
   vi. recovery means spaced from said extruder being adapted to receive the reinforced hose product, and
   vii. first and second traveling clamping members situated between the extruder and said recovery means, said traveling clamping members being adapted to operate sequentially for at least a portion of the distance between the extruder and said recovery means to continuously pull the reinforced hose product from the extruder to said recovery means.

2. Apparatus as defined in claim 1 wherein each of said traveling sleeve accumulators comprises a carriage, rail means extending along said mandrel and supporting said carriage, first drive means connected with said carriage for reciprocally moving the same over said rail means along said mandrel, frame means mounted on said carriage for displacement relative thereto, two pairs of spaced rollers journaled in said frame means for rotation about respective axes oriented transversely to the direction of movement of said carriage, said pairs of rollers being juxtaposed to opposite sides of said mandrel, two endless friction belts each trained about a respective pair of said rollers and each having one of its reaches disposed in close proximity to the associated side of said mandrel so as to be adapted to engage a corresponding surface portion of said sleeve upon the latter being supported by said mandrel, second drive means connected with said pairs of rollers for driving said belts so that the direction of movement of said belt reaches is toward said extruder, and operator means connected with said frame means and coordinated with said first drive means for displacing said frame means so as to shift said belt reaches into engagement with said sleeve only during the movement of said carriage in a direction away from said extruder, said second drive means being operable to impart to said belt reaches a lineal speed somewhat higher than the speed of movement of said carriage on said rail means.

3. Apparatus as defined in claim 1 wherein said second drive means is operable to impart to said belt reaches a lineal speed about 5 percent higher than said carriage speed.

4. Apparatus as defined in claim 1 wherein each of said traveling clamping members comprises a framework, rail means extending along the feed path of the reinforced hose product and supporting said framework, drive means connected with said framework for reciprocally moving the same over said rail means along said feed path, a pair of arcuate platens carried by said framework for movement toward and away from each other on opposite sides of said feed path and with their concavities facing one another, biasing means connected with said platens for normally urging the same away from each other, and operator means connected with said platens and coordinated with said drive means for moving said platens toward each other against the force of said biasing means and into engagement with the portion of the reinforced hose product then extending through the space between said platens only during the movement of said framework in a direction toward said recovery means.

5. Apparatus as defined in claim 4, wherein said operator means is arranged to force said platens into pressing contact with the reinforced hose product to positively clamp the latter.

6. Apparatus as defined in claim 5, wherein said platens have high friction linings secured to their concave hose-engaging surfaces.

7. Apparatus as defined in claim 4, wherein said operator means is arranged to force said platens into light nonpressing contact with the reinforced hose product, each of said platens is hollow and has its hose-engaging portion apertured, and a source of vacuum is connected to the interior of each of said platens to enable the same to grip the hose product by suction.

8. Apparatus as defined in claim 1 wherein drying means are interposed between the second traveling sleeve accumulator and the extruder, said drying means adapted to receive the mandrel and the sleeve of reinforcing carcass thereon and remove adsorbed or absorbed fluids from said sleeve as it advances therethrough.

9. Apparatus as defined in claim 1 wherein cooling means are interposed between the extruder and said first traveling clamping member, said cooling means adapted to receive the reinforced hose product upon egress from the extrusion head and cause a cooling fluid to impinge upon said hose product to cool said product during passage of said product through said cooling means.

10. Apparatus as defined in claim 9 wherein means for providing a high velocity stream of fluid to remove residual cooling fluid are interposed between said cooling means and said first traveling clamping member.

11. Apparatus as defined in claim 10 wherein said means for providing a high velocity stream of fluid comprises at least one annular air knife.

12. Apparatus as defined in claim 9 wherein said cooling means comprises a chamber having apertures therein permitting ingress and egress of said reinforced hose product, said chamber containing a plurality of spray nozzles therein adapted to emit sprays of cooling fluid to impinge upon said hose product.

13. Apparatus as defined in claim 1 wherein curing means are interposed between the extruder and said first traveling clamping member, said curing means being adapted to receive the reinforced hose product upon egress thereof from the extrusion coating head and effect curing of curable polymeric material encapsulating said reinforcing carcass upon passage of said product therethrough.

14. Apparatus as defined in claim 1 wherein the extrusion coating head contains a vacuum zone proximate the ingress side of said head adapted to remove occluded fluid from the reinforcing carcass as it enters the extrusion head.

15. Apparatus as defined in claim 1 wherein the first and second supported stationary clamping members each comprise an annular base, a plurality of jaws seated in said base and adapted to travel radially in said base, said jaws terminating in toothed engaging means, said annular base adapted to axially receive the mandrel, said mandrel having tooth-receiving apertures therein, said toothed engaging means adapted to engage and support said mandrel at said tooth-receiving apertures.

16. Apparatus for continuous manufacture of reinforced hose comprising:
   i. a feed roll adapted to rotate and supply a sleeve of reinforcing carcass;
   ii. an extruder spaced from said feed roll and having an extrusion coating head thereon, said extrusion coating head containing a die therein adapted to receive said reinforcing carcass sleeve and coat the inner and outer surfaces of said sleeve with polymeric material;
   iii. support means situated between said feed roll and said extruder, said support means comprising at least three upright stanchions spaced from each other;
   iv. first and second driven feed screws, said first feed screw being journaled for rotation between the first and second of said stanchions, said second feed screw being journaled for rotation between the second and third of said stanchions;
   v. a mandrel emanating from said extrusion coating head and terminating proximate said feed roll, said mandrel being adapted to receive thereon said sleeve of reinforcing carcass and support said sleeve upon passage thereof to the extrusion coating head;
   vi. first and second stationary clamping members respectively mounted on said first and second stanchions, said stationary clamping members being adapted to support said mandrel and to sequentially engage said mandrel to continuously maintain said mandrel in axial registration with said extrusion coating head;
   vii. support idler rollers affixed to each of said stanchions adapted to freely rotate and support said mandrel with said reinforcing sleeve thereon and to substantially maintain said mandrel and sleeve in axial alignment;
   viii. first and second traveling sleeve accumulators, said first accumulator situated between said first and second stationary clamping members and being adapted to travel therebetween by engagement with said first feed screw, said second accumulator situated between said second stationary clamping member and the third stanchion and being adapted to travel therebetween by engagement with said second feed screw; said first and second accumulators being adapted to sequentially engage at least a portion of the sleeve and push said sleeve to continuously compact and advance said sleeve along said mandrel toward the extruder, while said engaged accumulators sequentially travel in the direction of the feed roll; said accumulators being further adapted to sequentially disengage from said sleeve and travel freely in the direction of said extruder; said first and second accumulators being adapted to operate in concert with said first and second stationary clamping members to cause continuous advancement of said sleeve, said first stationary clamping member being disengaged during the period said first accumulator engages and pushes said sleeve, said second stationary clamping member being disengaged during the period said second accumulator engages and pushes said sleeve;

ix. drying means situated between said third stanchion and the extruder, said drying means adapted to receive the mandrel and the sleeve of reinforcing carcass thereon and remove adsorbed or absorbed fluids from said sleeve through circulation of a heated fluid therein as said sleeve advances therethrough;

x. a windup roll spaced from said extruder being adapted to rotate and receive the reinforced hose product;

xi. a cooling chamber situated between the extruder and the windup roll having an inlet and outlet therein adapted to receive the reinforced hose product and permit passage of said hose product therethrough, said cooling chamber adapted to contact said hose product with coolant upon passage therethrough;

xii. support means situated between said cooling chamber and said windup roll, said support means comprising at least three upright stanchions spaced from each other; and xiii. first and second traveling clamping members, said first traveling clamping member situated between the first and second upright stanchions and adapted to travel therebetween, said second traveling clamping member situated between the second and third upright stanchions and adapted to travel therebetween, said traveling clamping members being adapted to operate sequentially to provide continuous engagement of at least one of said traveling clamping members with said hose product and provide a continuous motive force pulling said hose product to the windup roll, said traveling clamping members being further adapted to sequentially engage said hose product while traveling toward said windup roll and to sequentially disengage from said hose product and travel freely in the direction of the cooling chamber.

17. Apparatus as defined in claim 16 wherein the cooling chamber additionally contains wiping means proximate the outlet thereof adapted to receive the cooled hose product and remove residual coolant therefrom.

18. Apparatus as defined in claim 16 wherein means for providing a high velocity stream of air adapted to contact the periphery of the hose product and remove residual coolant therefrom is interposed between the cooling chamber and the first traveling clamping member.

19. Apparatus as defined in claim 16 wherein curing means are substituted in lieu of said cooling chamber.

* * * * *

PO-1050
(5/69)

UNITED STATES PATENT OFFICE
CERTIFICATE OF CORRECTION

Patent No. 3,640,656      Dated February 8, 1972

Inventor(s) Jan J. Boguslawski

It is certified that error appears in the above-identified patent and that said Letters Patent are hereby corrected as shown below:

Column 3, line 59, for "absorbed" (first occurrence) read --adsorbed--. Column 10, line 46, for "accumulators" read --accumulator--. Column 11, line 25, for "1" read --2--.

Signed and sealed this 29th day of May 1973.

(SEAL)
Attest:

EDWARD M. FLETCHER, JR.
Attesting Officer

ROBERT GOTTSCHALK
Commissioner of Patents